US011868638B2

(12) United States Patent
Dhir et al.

(10) Patent No.: US 11,868,638 B2
(45) Date of Patent: Jan. 9, 2024

(54) INTER-MEMORY MOVEMENT IN A MULTI-MEMORY SYSTEM

(71) Applicant: Micron Technology, Inc., Boise, ID (US)

(72) Inventors: Sourabh Dhir, Boise, ID (US); Kang-Yong Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 111 days.

(21) Appl. No.: 17/018,570

(22) Filed: Sep. 11, 2020

(65) Prior Publication Data

US 2022/0066675 A1 Mar. 3, 2022

Related U.S. Application Data

(60) Provisional application No. 63/072,604, filed on Aug. 31, 2020.

(51) Int. Cl.
*G06F 12/00* (2006.01)
*G06F 3/06* (2006.01)

(52) U.S. Cl.
CPC .......... *G06F 3/0647* (2013.01); *G06F 3/0616* (2013.01); *G06F 3/0635* (2013.01); *G06F 3/0653* (2013.01); *G06F 3/0659* (2013.01); *G06F 3/0683* (2013.01)

(58) Field of Classification Search
CPC .... G06F 11/008; G06F 11/22; G06F 11/3058; G06F 11/3495; G06F 17/00; G06F 11/1662; G06F 11/2094

USPC ......................................................... 711/154
See application file for complete search history.

(56) References Cited

U.S. PATENT DOCUMENTS

| | | | | |
|---|---|---|---|---|
| 8,489,893 B2* | 7/2013 | Damian | .................... | H04L 9/06 713/193 |
| 9,933,980 B2* | 4/2018 | Law | ...................... | G06F 3/0635 |
| 11,175,984 B1* | 11/2021 | Lercari | ................ | G06F 11/0784 |
| 2008/0008205 A1* | 1/2008 | Jung | .................... | H04L 67/1097 370/419 |
| 2011/0161567 A1* | 6/2011 | Song | .................... | G06F 12/0246 711/E12.001 |
| 2014/0156815 A1* | 6/2014 | Kitahara | ................ | G06F 3/0607 709/221 |
| 2016/0070663 A1* | 3/2016 | Tanzawa | ............. | G06F 13/1694 711/156 |
| 2016/0314078 A1* | 10/2016 | Blake | ................... | G06F 12/1027 |
| 2018/0019007 A1* | 1/2018 | Lee | ...................... | G06F 13/1684 |
| 2018/0113628 A1* | 4/2018 | Roberts | ................ | G11C 7/1072 |
| 2018/0122434 A1* | 5/2018 | Lee | .......................... | G11C 5/04 |
| 2019/0042162 A1* | 2/2019 | McCall | ............... | G06F 12/0653 |

(Continued)

*Primary Examiner* — Mohamed M Gebril
(74) *Attorney, Agent, or Firm* — Holland & Hart LLP (57) ABSTRACT

Methods, systems, and devices for improved inter-memory movement in a multi-memory system are described. A memory device may receive from a host device a command to move data from a first memory controlled by a first controller to a second memory controller by a second controller. The memory device may use the first and second controllers to facilitate the movement of the data from the first memory to the second memory via a path external to the host device. The memory device may indicate to the host device when to suspend activity to the first memory or the second memory and when to resume activity to the first memory or second memory.

12 Claims, 5 Drawing Sheets

(56) References Cited

U.S. PATENT DOCUMENTS

2019/0243552 A1\* 8/2019 Maharana .......... G11C 14/0009
2020/0218646 A1\* 7/2020 Li ........................... G06F 13/28

\* cited by examiner

INTER-MEMORY MOVEMENT IN A MULTI-MEMORY SYSTEM

CROSS REFERENCE

The present Application for Patent claims priority to U.S. Provisional Patent Application No. 63/072,604 by Dhir, et al., entitled "Improved Inter-Memory Movement in a Multi-Memory System," filed Aug. 31, 2020, assigned to the assignee hereof, and expressly incorporated by reference in its entirety herein.

BACKGROUND

The following relates generally to one or more systems for memory and more specifically to improved inter-memory movement in a multi-memory system.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

A device, such as an electronic device, may include multiple memories that have different characteristics and that the device uses for different purposes. For example, a device may include a memory for long term data storage, a memory that serves as a main memory (e.g., a primary memory for storing data being accessed by a host device), and a memory that serves as a cache (e.g., a secondary memory for storing frequently accessed or high priority data), among other purposes or configurations. To realize latency and power consumption advantages, the device may transfer data between the memories, a transaction that may be referred to herein as an inter-memory data movement. In other different systems, to perform an inter-memory data movement, a host device may retrieve data from one memory and communicate it to another memory for storage. Thus, the data involved in an inter-memory data movement may be routed through the host device. But routing data through a host device for the inter-memory data movement may, among other disadvantages, increase latency (e.g., because the data path is long) and increase power consumption (e.g., because many operations are performed).

According to the techniques described herein, a device may reduce the latency and power consumption associated with inter-memory data movement by communicating data from one memory to another memory without routing the data through the host device. For example, a controller coupled with and that controls multiple memories may use a data path (e.g., internal to the controller, external to the host device) to move data from one memory to another memory. Because the host device is not involved in the inter-memory data movement, the host device may inadvertently attempt to access one of the memories while that memory is busy with the inter-memory data movement. To prevent such a scenario, the controller may provide an indication to the host device regarding the recommended suspension and resumption of activity related to one or more memories involved in the inter-memory movement.

Features of the disclosure are initially described in the context of a system as described with reference to FIGS. 1 and 2. Features of the disclosure are described in the context of a process flow as described with reference to FIG. 3. These and other features of the disclosure are further illustrated by and described with reference to an apparatus diagram and a flowchart that relate to improved inter-memory data movement in a multi-memory system as described with reference to FIGS. 4 and 5.

Figure 1:
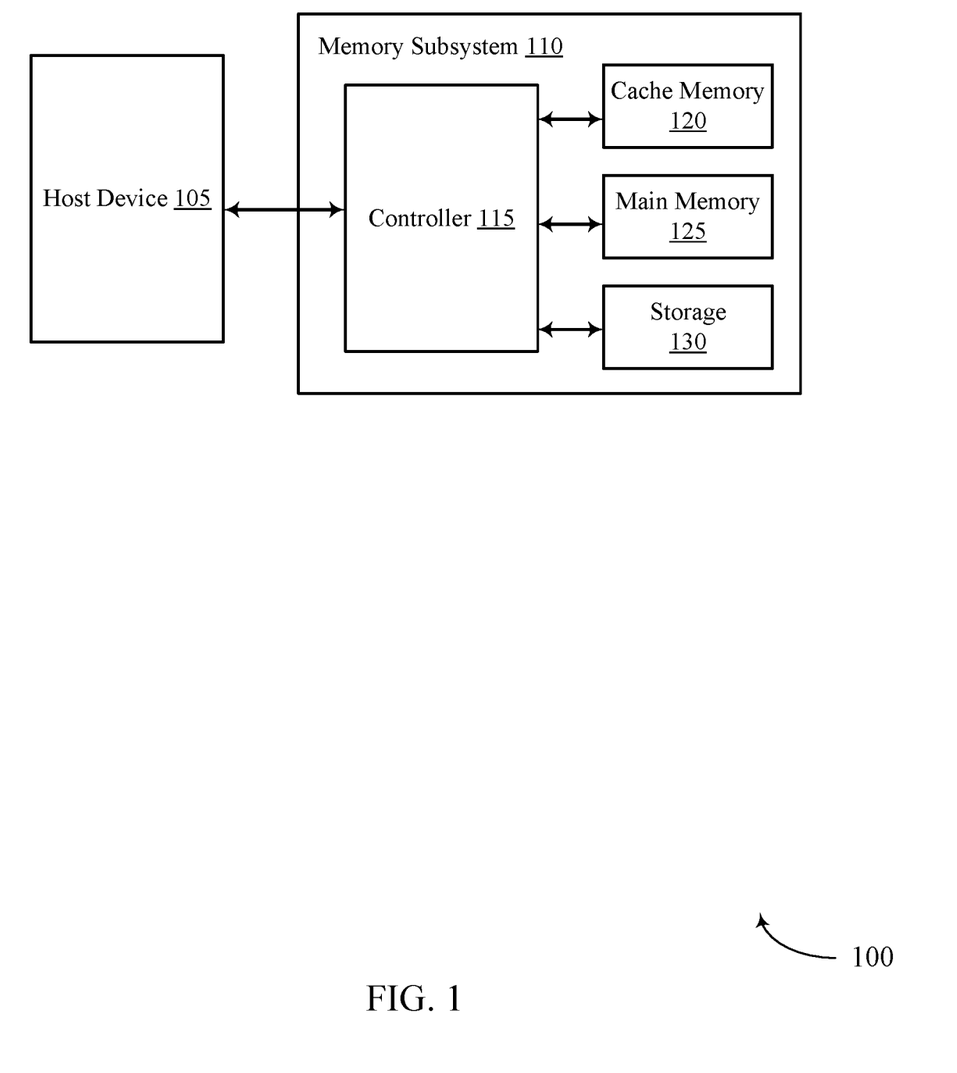
FIG. 1 illustrates an example of a system that supports improved inter-memory movement in accordance with examples as disclosed herein.

FIG. 1 illustrates an example of a system 100 that supports improved inter-memory data movement in accordance with examples as disclosed herein. The system 100 may be included in an electronic device such a computer or phone. The system 100 may include a host device 105 and a memory subsystem 110. The memory subsystem 110 may store information (electronic information, digit information, data) for the host device 105 in a cache memory 120, a main memory 125, and storage 130. The memory subsystem 110 may access data in the various memories using the controller 115, which may interface with the host device 105. In some examples, the controller 115, cache memory 120, main memory 125, and storage 130 may be included in a same physical package. However, one or more of the controller 115, cache memory 120, main memory 125, and storage 130 may be disposed on different, respective dies (e.g., silicon dies). Thus, the memory subsystem may represent a multi-chip package.

The devices in the system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

In some examples, the system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the system 100 may be capable of machine-type communication (MTC), machine-to-machine (M2M) communication, or device-to-device (D2D) communication. In some examples, the device associated with the system 100 may be referred to as a user equipment (UE), station (STA), mobile terminal, or the like.

The host device 105 may be a processor or system-on-a-chip (SoC) that interfaces with the controller 115 as well as other components of the electronic device that includes the system 100. To access information in cache memory 120, main memory 125, or storage 130, the host device 105 may communicate access commands (e.g., activate commands, read commands, write commands, pre-charge commands) to the controller 115. The host device 105 may know the addresses of each of the memories and the data stored at each address. Thus, the access commands communicated by the host device 105 may target certain addresses of the memories. The host device 105 may be or include a processor, an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The controller 115 may be configured to interface with cache memory 120, main memory 125, and storage 130 in response to commands from the host device 105 (e.g., based on one or more commands or requests issued by the host device 105). For instance, the controller 115 may facilitate the retrieval of data from, and the storage of data to, cache memory 120, main memory 125, and storage 130 in response to commands from the host device 105. Thus, the controller 115 may facilitate data transfer between various subcomponents, such as between at least some of the host device 105, cache memory 120, main memory 125, and storage 130. The controller 115 may interface with the host device 105, cache memory 120, main memory 125, and storage 130 using one or more protocols.

Storage 130 may include an array or arrays of memory cells and one or more local memory controllers configured to operate the array(s) of memory cells. In some examples, the memory cells in storage 130 may be or include NAND memory cells (e.g., main memory 125 may be managed NAND (mNAND) memory). Relative to the access latency for the other memories in the memory subsystem 110, the access latency for storage 130 may be quite long (e.g., orders of magnitude greater). Additionally, the access latency for storage 130 may be non-deterministic (e.g., unknown, unpredictable, varying between accesses). Thus, the controller 115 may use one or more flags to inform the host device 105 of the status of storage 130 so that the host device 105 can issue access commands for storage 130 with an appropriate timing. It should be appreciated that in some examples the power consumed by storage 130 may be low compared to the power consumed by the other memories in the memory subsystem 110.

Main memory 125 may include an array or arrays of memory cells and one or more local memory controllers configured to operate the array(s) of memory cells. In some examples, the memory cells in main memory 125 may be or include FeRAM cells (e.g., main memory 125 may be FeRAM). Thus, main memory 125 may have a shorter latency for access operations than storage 130. For example, retrieving data from main memory 125 may take less time than retrieving data from storage 130. However, unlike the access timing for storage 130, the access timing of main memory 125 may be deterministic (e.g., known, predictable, fixed for certain access operations). So, the host device 105 may use one or more internal timers or clock to determine appropriate times to issue access commands to main memory 125. As noted, main memory 125 may consume more power than storage 130 but less power than cache memory 120.

Cache memory 120 may include an array or arrays of memory cells and one or more local memory controllers configured to operate the array(s) of memory cells. In some examples, the memory cells in cache memory 120 may be or include DRAM cells (e.g., main memory 125 may be DRAM). Thus, cache memory 120 may have a shorter latency for access operations than main memory 125 and storage 130. Like the access timing of main memory 125, the access timing of cache memory 120 may be deterministic. So, the host device 105 may use one or more internal timers or clock to determine appropriate times to issue access commands to cache memory 120. It should be appreciated that the cache memory 120 may consume more power than main memory 125 and storage 130.

Thus, the memories in the memory subsystem 110 may be different memory technologies that have different characteristics (e.g., latencies, power consumption, densities). For example, storage 130 may be a flash memory technology, such as mNAND memory, that provides large amounts of long term storage at a low power (relative to the other memories). Thus, the host device 105 may use storage 130 to store information that is not in use by the system 100 but that the host device 105 ultimately wishes to preserve. For example, the host device may use storage 130 to store the operating system (OS) for the system 100, applications, files, images, videos, etc. that the host device 105 wishes to preserve for access at a later time.

Storage 130, however, may have slow (relative to the other memories) and non-deterministic access times. So, when the host device 105 wishes to access certain information stored in storage 130, the host device 105 may move that information from storage 130 to main memory 125 so that the information can be quickly supplied to the host device 105. If the host device 105 expects to access information relatively frequently or has a certain data rate requirement for obtaining information, the host device 105 may move that information from storage 130 or main memory 125 to cache memory 120 so that access is even faster. However, cache memory 120 may have higher power consumption than main memory 125, which may have higher power consumption that storage 130.

So, the host device 105 may shuffle information between the memories of the memory subsystem 110 in an effort to optimize latency and power consumption. For example, to reduce latency, among other advantages, the host device 105 may move information from storage 130 to main memory 125 or the cache memory when the information is needed by the host device 105 (e.g., when an application, file, image, video, etc. is opened). And to reduce power consumption, among other advantages, the host device 105 may move information to storage 130 from cache memory 120 or main memory 125 when that information is no longer needed.

In other different systems, to move information between the memories (a process referred to herein as an inter-memory data movement), the host device 105 may first retrieve the information from the originating memory (e.g., storage 130) and then provide the information to the destination memory (e.g., main memory 125). That is, the information may be routed from one memory to the other memory through the host device 105. But routing information from one memory to another memory through the host device 105 may consume time and power, thereby decreasing the performance of the system 100.

According to the techniques described herein, information from one memory may be routed to another memory via a data path that is internal to the memory subsystem 110. This way, routing the information through the host device 105 can be avoided, which may improve the latency and power consumption of the system 100. As described herein and with reference to FIG. 2, such a technique may involve multiple controllers in the controller 115 and a flag that indicates to the host device 105 when access commands to certain memories should be suspended.

The system 100 may include any quantity of non-transitory computer readable media that support improved inter-memory data movement. For example, the host device 105, the memory subsystem 110, the controller 115, or the memories may include or otherwise may access one or more non-transitory computer readable media storing instructions (e.g., firmware) for performing the functions ascribed herein to host device 105, the memory subsystem 110, the controller 115, and/or the memories. For example, such instructions, when executed by the host device 105 (e.g., by a host system controller), by the memory subsystem 110, by the controller 115, or by the memories, may cause the host device 105, the memory subsystem 110, the controller 115, or the memories to perform associated functions as described herein.

Figure 2:
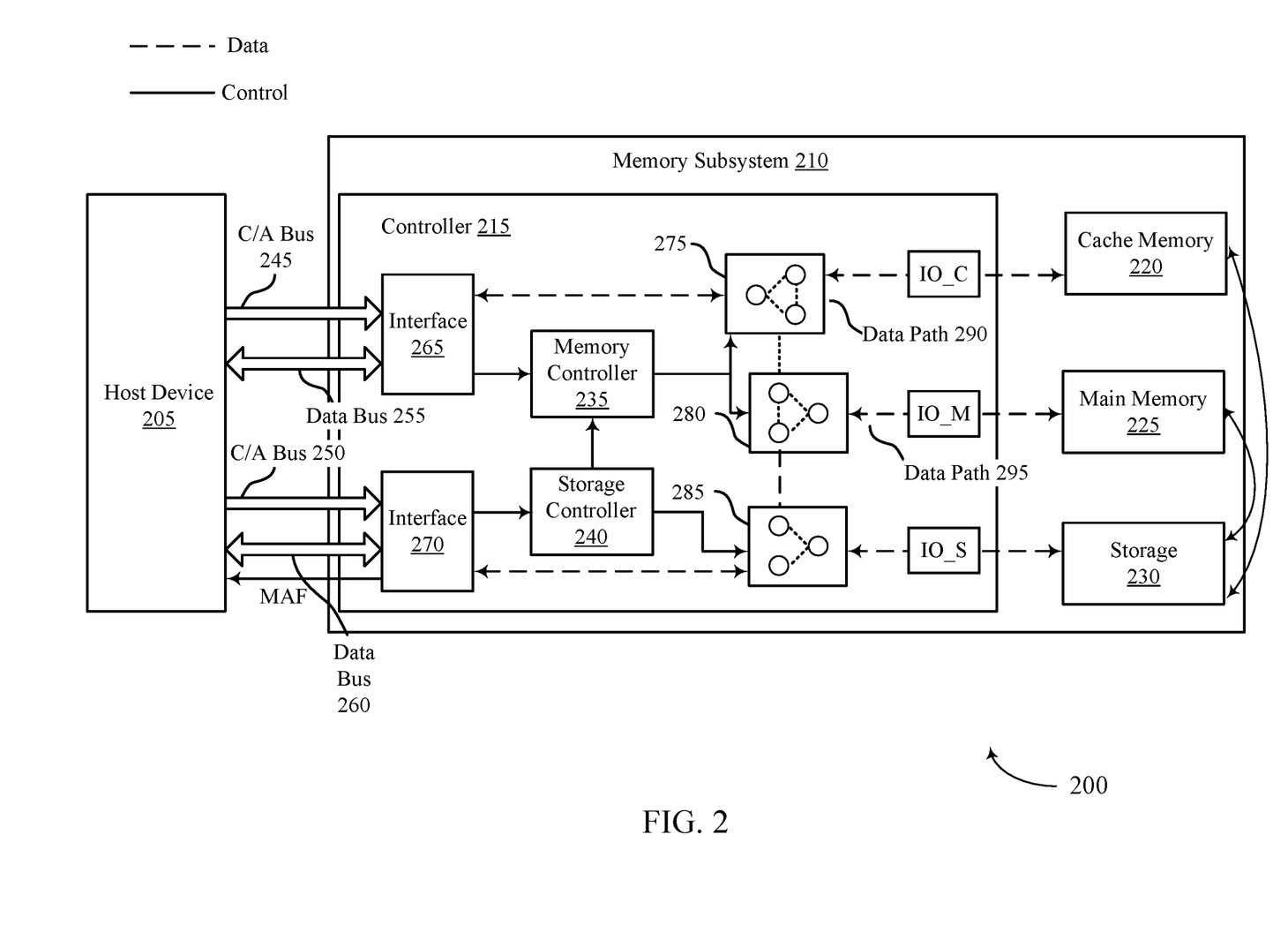
FIG. 2 illustrates an example of a system that supports improved inter-memory movement in accordance with examples as disclosed herein.

FIG. 2 illustrates an example of a system 200 that supports improved inter-memory data movement in accordance with examples as disclosed herein. The system 200 may be an example of the system 100 with described with reference to FIG. 1. Thus, the system 200 may include a host device 205 and memory subsystem 210, which may interact as described with reference to FIG. 1. The memory subsystem 210 may include a controller 215, cache memory 220, main memory 225, and storage 230, which may be examples of the respective components described with reference to FIG. 1. According to the techniques described herein, the controller 215 may receive a command to move data between memories and route the data from the origination memory to the destination memory via a path internal to the memory subsystem 210 (and external to the host device 205). To prevent the host device 205 from attempting to access one of the memories while that memory is busy with the inter-memory data movement, the controller 215 may indicate to the host device 205 appropriate times for the host device 205 to suspend and resume activity to that memory.

The controller 215 may include one or more sub-controllers that may control one or more respective memories. For example, the controller 215 may include a storage controller 240 that controls storage 230 (e.g., by issuing access commands and addresses to storage 230) and a memory controller 235 that controls cache memory 220 and main memory 225 (e.g., by issuing access commands and addresses to cache memory 220 and main memory 225, respectively). The storage controller 240 and the memory controller 235 may use different protocols for accessing the respective memories, which may have different architectures, densities, or latencies, among other characteristics. The storage controller 240 and the memory controller 235 may be or include logic, circuitry, a processor, a controller, or other components capable of performing the functions described herein.

In addition to controlling respective memories, the controllers (memory controller 235, storage controller 240) may control routing circuitry that directs the transfer of data within the memory subsystem 210. For example, for an inter-memory data movement between cache memory 220 and storage 230, the memory controller 235 may control the routing circuitry 275 and the routing circuitry 280 (and the storage controller 240 may control the routing circuitry 285) so that data is transferred from cache memory 220 to storage 230 (or vice versa) via data path 290. Similarly, for an inter-memory data movement between main memory 225 and storage 230, the memory controller 235 may control the routing circuitry 280 (and the storage controller 240 may control the routing circuitry 285) so that data is transferred from main memory 225 to storage 230 (or vice versa).

The host device 205 may obtain data from (or store data in) cache memory 220 or main memory 225 or both by instructing the memory controller 235 to perform access operations on cache memory 220 and main memory 225. For example, the host device 205 may transmit control information (e.g., access commands for cache memory 220 and/or main memory 225, addresses for cache memory 220 and/or main memory 225) to memory controller 235. Similarly, the host device 205 may obtain data from (or store data in) storage 230 by instructing the storage controller 240 to perform access operations on storage 230. For example, the host device 205 may transmit control information (e.g., access commands for storage 230, addresses for storage 230) to storage controller 240. For non-inter-memory data movements, the control information sent to a controller (e.g., memory controller 235, storage controller 240) may be for the memory controlled by that controller. However, for inter-memory data movements, the host device 205 may send control information for cache memory 220 and main memory 225 to storage controller 240 (as opposed to memory controller 235).

The storage controller 240 may facilitate inter-memory data communications between storage 230 and cache memory 220 or between storage 230 and main memory 225. For example, the storage controller 240 may cause the memory subsystem 210 to move data from one memory to another using the data path 290 or the data path 295. By using a data path internal to the memory subsystem 210—as opposed to routing the data through the host device 205—the memory subsystem 210 may reduce the latency and power consumption associated with the inter-memory data movement.

As an example, the memory controller 235 may receive from the host device 205 a command (e.g., an inter-memory data movement command) that instructs the memory controller 235 to move data from storage 230 to main memory 225. The memory controller 235 may also receive the origination address for the inter-memory data movement (e.g., the starting address of the memory cells in storage 230 that store the data) and the destination address for the inter-memory data movement (e.g., the starting address of the memory cells in main memory 225 for storing the data).

Thus, the storage controller 240 may receive an address for a memory (e.g., main memory 225) that the storage controller 240 does not directly control.

In response to the command for the inter-memory data movement, the storage controller 240 may transmit the destination address and one or more access commands (e.g., write commands) to the memory controller 235. The storage controller 240 may also transmit the origination address and one or more access commands (e.g., read commands) to storage 230. The access commands transmitted by the storage controller 240 may cause the data to be read from storage 230, communicated to main memory 225 via data path 295, and stored in main memory 225 (or vice versa for an inter-memory data movement from main memory to storage 230). The data path 295 may go through or include routing circuitry 285, routing circuitry 280, one or more input/output channels for storage 230 (IO_S), or one or more I/O channels for main memory 225 (TO M), or any combination thereof.

Routing circuitry may refer to a combination of components, circuitry, logic, and/or other hardware capable of directing the transfer of data within the memory subsystem 210. I/O channels may refer to conductive traces, buses, bus interfaces, buffers, and the like, that enable the transfer of data to and from a memory. In some examples, a set of data from one memory may be moved to the other memory in subsets of information (e.g., subset of bits). For example, a 2 kB set of data may be moved from storage 230 to main memory 225 in subsets of data that are 64B each, meaning that multiple rounds of reading, transferring, and writing at a 64B granularity may occur.

As noted, storage 230 may have a non-deterministic access latency, meaning that the access timing for storage 230 may be variable, fall outside a determined duration, and/or unpredictable. Although main memory 225 may have deterministic access latency, the host device 205 may not know when main memory 225 is busy with the inter-memory data movement because the operations of main memory 225 may be dependent on various factors or other components, such as storage 230. For example, in an inter-memory data movement from main memory 225 to storage 230, main memory 225 may be prevented from transferring data to storage 230 until storage 230 is ready, which may not occur for an unpredictable amount of time. And in an inter-memory data movement from storage 230 to main memory 225, main memory 225 may receive the data according to the timeline of storage 230, which may be unpredictable because there is no fixed latency for accessing the data and preparing it for communication. Thus, the host device 205 may not know when main memory 225 is busy with an inter-memory data movement even though the main memory has a deterministic access latency.

To prevent the host device 205 from attempting to access main memory 225 when main memory 225 is busy with an inter-memory data movement, the memory subsystem 210 may send an indication to the host device 205 when the main memory 225 will be (e.g., prospectively) or is busy (e.g., currently). For example, the storage controller 240 may send a control signal that indicates the host device 205 should suspend activity (e.g., the issuance of access commands) related to main memory 225 in the future (during a given duration starting at time x and running until time y) or from the time of reception the control signal for a set duration. Upon receipt of the control signal, the host device 205 may suspend activity to main memory 225. When main memory 225 is finished with the inter-memory data movement, the storage controller 240 may modify the control signal to indicate that the host device 205 may resume activity for main memory 225. The control signal may be referred herein to as a Memory Activity Flag (MAF).

Figure 3:
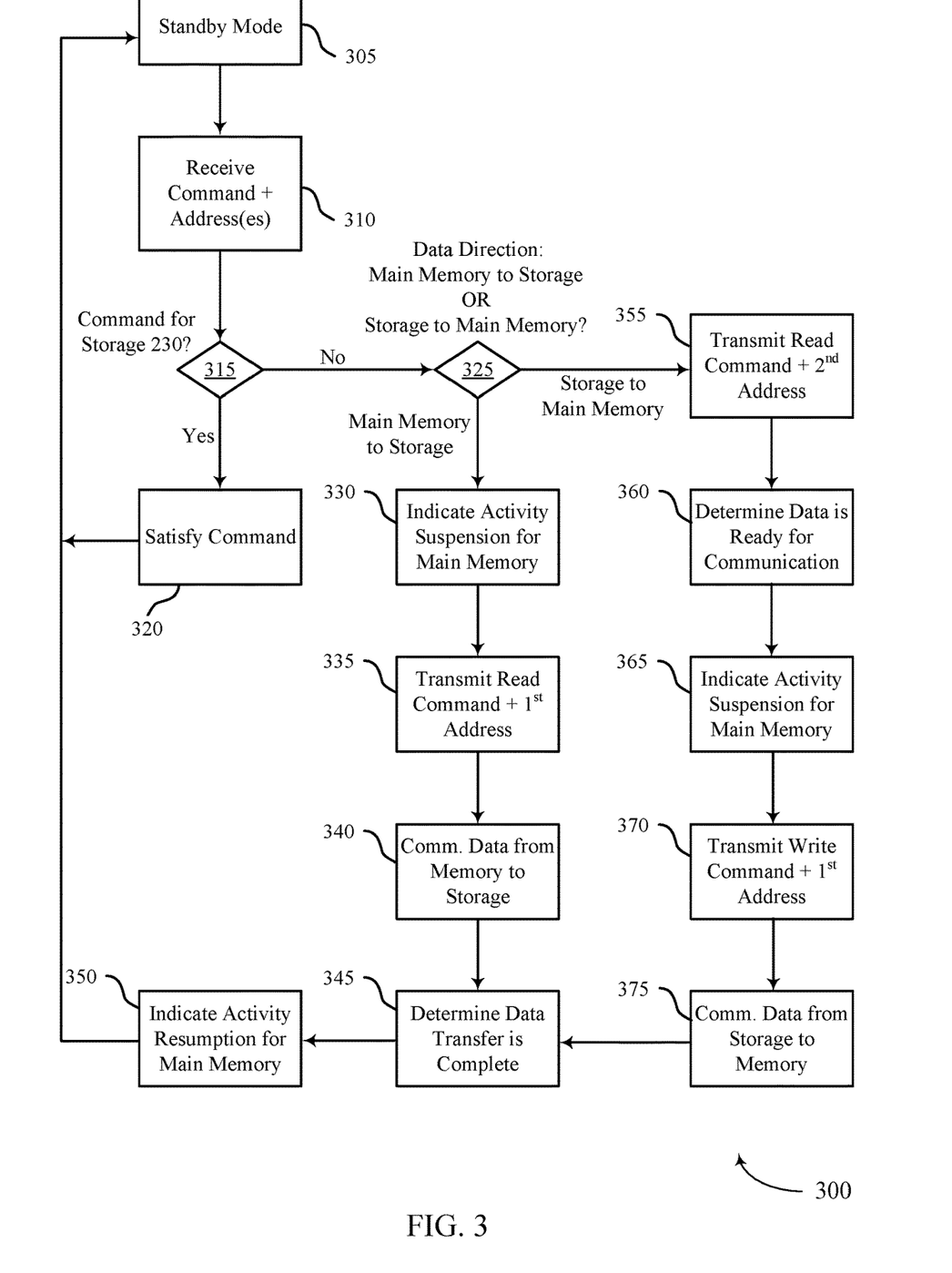
FIG. 3 illustrates an example of a process flow that supports improved inter-memory movement in a multi-memory system in accordance with examples as disclosed herein.

As described herein and with reference to FIG. 3, the MAF may be asserted (e.g., to indicate activity suspension) upon different triggers depending on the direction of the data movement. For instance, if the data movement is from main memory 225 to storage 230, the MAF may be asserted when the storage controller 240 receives the command to perform the inter-memory movement. But if the data movement is from storage 230 to main memory 225, the storage controller 240 may delay asserting the MAF until after storage 230 has prepared the data for transfer. Such strategic assertion of the MAF may allow the host device 205 to continue to access main memory 225 while storage 230 prepares for the inter-memory data movement, thereby increasing system performance. Thus, storage controller 240 may use the MAF to ensure that the host device 205 accesses main memory 225 in an appropriate manner (e.g., in a manner that does not conflict with an inter-memory data movement).

Thus, the system 200 may perform an inter-memory data movement that reduces latency, power consumption, and prevents conflicting access attempts by the host device 205. Although described with reference to an inter-memory data movement between storage 230 and main memory 225, the techniques described herein can be implemented for an inter-memory data movement between storage 230 and cache memory 220. However, in such a scenario the data may be communicated using data path 290, which may go through or include routing circuitry 275, routing circuitry 280, routing circuitry 285, one or more input/output channels for storage 230 (IO_S), and one or more I/O channels for cache memory 220 (IO_C).

It should be appreciated that the controller 215 may communicate with the host device 205 over one or more buses using one or more interfaces. For example, the memory controller 235 may, via interface 265, receive commands and addresses for cache memory 220 and main memory 225 over the command and address (C/A) bus 245. And the memory controller 235 may, via interface 265, transmit data read from cache memory 220 and main memory 225 to the host device 205 over the data bus 255; and receive data for cache memory 220 and main memory 225 over the data bus 255. Similarly, the storage controller 240 may, via interface 270, receive commands and addresses for storage 230 over the C/A bus 250. And the storage controller 240 may, via interface 270, transmit data read from storage 230 to the host device 205 over the data bus 260; and receive data for storage 230 over the data bus 260. In some examples, the protocol used for communications between the host device 205 and the memory controller 235 is different from the protocol used for communications between the host device and the storage controller 240. For example, the memory controller 235 may support a Low Power Double Data Rate (LPDDR) protocol and the storage controller 240 may support a Universal Flash Storage (UFS) protocol.

FIG. 3 illustrates an example of a process flow that supports improved inter-memory data movement in accordance with examples as disclosed herein. Process flow 300 may be implemented by a memory subsystem as described with reference to FIGS. 1 and 2. However, other types of devices may implement process flow 300. For ease of reference, process flow 300 is described with reference to the memory subsystem 210. Additionally or alternatively, aspects of process flow 300 may be implemented as instructions stored in memory (e.g., firmware stored in storage 130, 230 and/or main memory 125, 225). For example, the instructions, when executed by a controller, may cause the controller to perform the operations of process flow 300. Although described with reference to an inter-memory data movement between storage and main memory, aspects of process flow 300 may be implemented for an inter-memory data movement between storage and cache memory.

At 305 the device may be in standby mode. For example, one or more components of the memory subsystem 210 may be in a low power mode awaiting a command from the host device 205. At 310, a command and one or more addresses may be received. For example, storage controller 240 may receive a command, a first address for main memory 225, and a second address for storage 230. The command, first address, and second address may be transmitted to the storage controller 204 from the host device 205. In some examples, the command may be an inter-memory data movement command.

It should be appreciated that before issuing an inter-memory data movement command the host device 205 may first determine to perform an inter-memory data movement. For example, the host device 205 may determine to perform an inter-memory data movement from storage 230 to main memory 225 when the host device 205 determines that it wishes to access data in the storage 230 quickly and in a deterministic manner. Or the host device 205 may determine to perform an inter-memory data movement from main memory 225 to storage when the host device 205 determines that it wishes preserve (e.g., in a power-efficient manner) data that is no longer in use by the host device 205. Similar determinations may prompt inter-memory data movement between the storage 230 and the cache memory 220, with possible additional considerations such as access frequency, data priority, and error correction needs.

At 315, it may be determined whether the command is an access command for storage. For example, storage controller 240 may determine whether the command is an access command for storage 230. In some examples, the operations at 315 may be described as storage controller 240 determining whether the command is an inter-memory data movement command. Alternatively, the operations at 315 may be described at storage controller 240 determine whether the command implicates multiple memories.

If, at 315, it is determined that the command is an access command for storage 230 (e.g., the command is not for an inter-memory data movement), the memory subsystem 210 may satisfy the access command at 320 and the process may proceed to 305. For example, the memory subsystem 210 may read data from storage 230 and return the data to the host device 205. Or the memory subsystem 210 may write provided data to storage 230. If, at 315, it is determined that the command is not an access command for storage 230 (e.g., the command is for an inter-memory data movement), the process may proceed to 325. At 325, the direction of the inter-memory data movement may be determined. For example, storage controller 240 may determine whether the direction of the data movement is from main memory 225 to storage 230 or from storage 230 to main memory 225.

If, at 325, it is determined that the data movement is from main memory 225 to storage 230, the process may proceed to 330. At 330, an indication that activity for main memory 225 should be suspended may be transmitted. For example, storage controller 240 may indicate the suspension of activity to the host device 205 by asserting the MAF. By indicating the suspension upon receipt of the command, storage controller 240 may prevent the host device 205 from interfering with the inter-memory data movement. Indeed, upon receipt of the indication, the host device 205 may suspend activity to main memory 225. Suspension of activity to a memory may involve buffering one or more access commands for that memory that would otherwise be issued. At 335, an access command and the first address may be transmitted to the controller for the main memory. For example, storage controller 240 may transmit a read command and the first address to memory controller 235. The storage controller 240 may also transmit a write command and the second address to storage 230.

At 340, data may be communicated from main memory to storage. For example, the memory subsystem 210 may communicate data from main memory 225 to storage 230. To do so, the data (or at least a subset of the data) may be read from the first memory address in main memory 225, communicated over data path 295, and written to the second memory address in storage 230. In some examples, multiple subsets of the data may be communicated serially in this manner. At 345, it may be determined that the transfer of data from main memory to storage is complete. For example, the storage controller 240 may determine that the transfer of data from main memory 225 to storage 230 is complete (e.g., the last subset of data has been communicated to and/or stored in storage 230). Accordingly, at 350, an indication that activity for the main memory can be resumed may be transmitted. For example, storage controller 240 may indicate (by de-asserting the MAF) to the host device 205 that activity to main memory 225 can be resumed. Accordingly, the host device 205 may resume activity to main memory 225 by issuing one or more access commands for main memory 225. After 350, the process may proceed to 305. Thus, the memory subsystem 210 may satisfy an inter-memory data movement from main memory 225 to storage 230.

If, at 325, it is determined that the data movement is from storage 230 to main memory 225, the process may proceed to 355. At 355, an access command and the second address may be transmitted to storage. For example, storage controller 240 may transmit a read command and the second address to storage 230. In response to the read command, storage 230 may prepare the data (or at least a subset of the data) for transfer to main memory 225. For example, storage 230 may read the data (or at least the subset of the data) from the second address of storage 230 and transfer the data (or at least the subset of the data) to a buffer for relay to main memory 225.

Because the amount of time needed to prepare the data at storage 230 is unknown (due to the non-deterministic access latency of storage 230), the memory subsystem 210 may refrain from asserting the MAF until the data is ready for transfer. Such a technique may allow the host device 205 to continue to access main memory 225 while storage 230 is busy. At 360, it may be determined that the data is ready for communication to main memory. For example, the storage controller 240 may determine that the data from storage 230 is ready for communication to main memory 225. Data may be considered ready for communication if the data is buffered or held at a location from which the data can be readily transferred (e.g., transferred within a threshold amount of time). At 365, an indication that activity for the main memory should be suspended may be transmitted. For example, storage controller 240 may indicate the suspension of activity to the host device 205 by asserting the MAF. By indicating the suspension upon receipt of the command, storage controller 240 may prevent the host device 205 from interfering with the inter-memory data movement. Indeed, upon receipt of the indication, the host device 205 may suspend activity to main memory 225.

At 370, an access command and the first address may be transmitted to the controller for the main memory. For example, storage controller 240 may transmit a write command and the first address to memory controller 235. At 375, data may be communicated from storage to main memory. For example, the memory subsystem 210 may communicate data from storage 230 to main memory 225. To do so, the data (or at least a subset of the data) may be read from the second memory address in storage 230, communicated over data path 295, and written to the first memory address in main memory 225. In some examples, multiple subsets of the data may be communicated serially in this manner.

After 375, the process may proceed to 345. At 345, it may be determined that the transfer of data from storage to main memory is complete. For example, the storage controller 240 may determine that the transfer of data from storage 230 to main memory 225 is complete (e.g., the last subset of data has been communicated to and/or stored in memory 225). Accordingly, at 350, an indication that activity for the main memory can be resumed may be transmitted. For example, storage controller 240 may indicate (by de-asserting the MAF) to the host device 205 that activity to main memory 225 can be resumed. Thus, the host device 205 may resume activity to main memory 225 by issuing one or more access commands for main memory 225. After 350, the process may proceed to 305. Thus, the memory subsystem 210 may satisfy an inter-memory data movement from storage 230 to main memory 225.

Although described with reference to inter-memory data movements between storage 230 and main memory 225, it should be appreciated that the operations of process flow 300 may be similar for inter-memory data movements between storage 230 and main memory 225. It should also be appreciated that alternative examples of the process flow 300 may be implemented in which some operations are performed in a different order than described or are not performed at all. Additionally, operations may include additional features not mentioned, or additional operations may be added. Further, certain operations may be performed multiple times or certain combinations of operations may repeat or cycle.

Aspects of the process flow 300 may be implemented by a controller, among other components. Additionally or alternatively, aspects of the process flow 300 may be implemented as instructions stored in memory (e.g., firmware stored in a memory coupled with memory subsystem 210 such as main memory 225, cache memory 220, or another memory). For example, the instructions, when executed by a controller (e.g., the memory controller 235, the storage controller 240), may cause the controller to perform the operations of the process flow 400.

Figure 4:
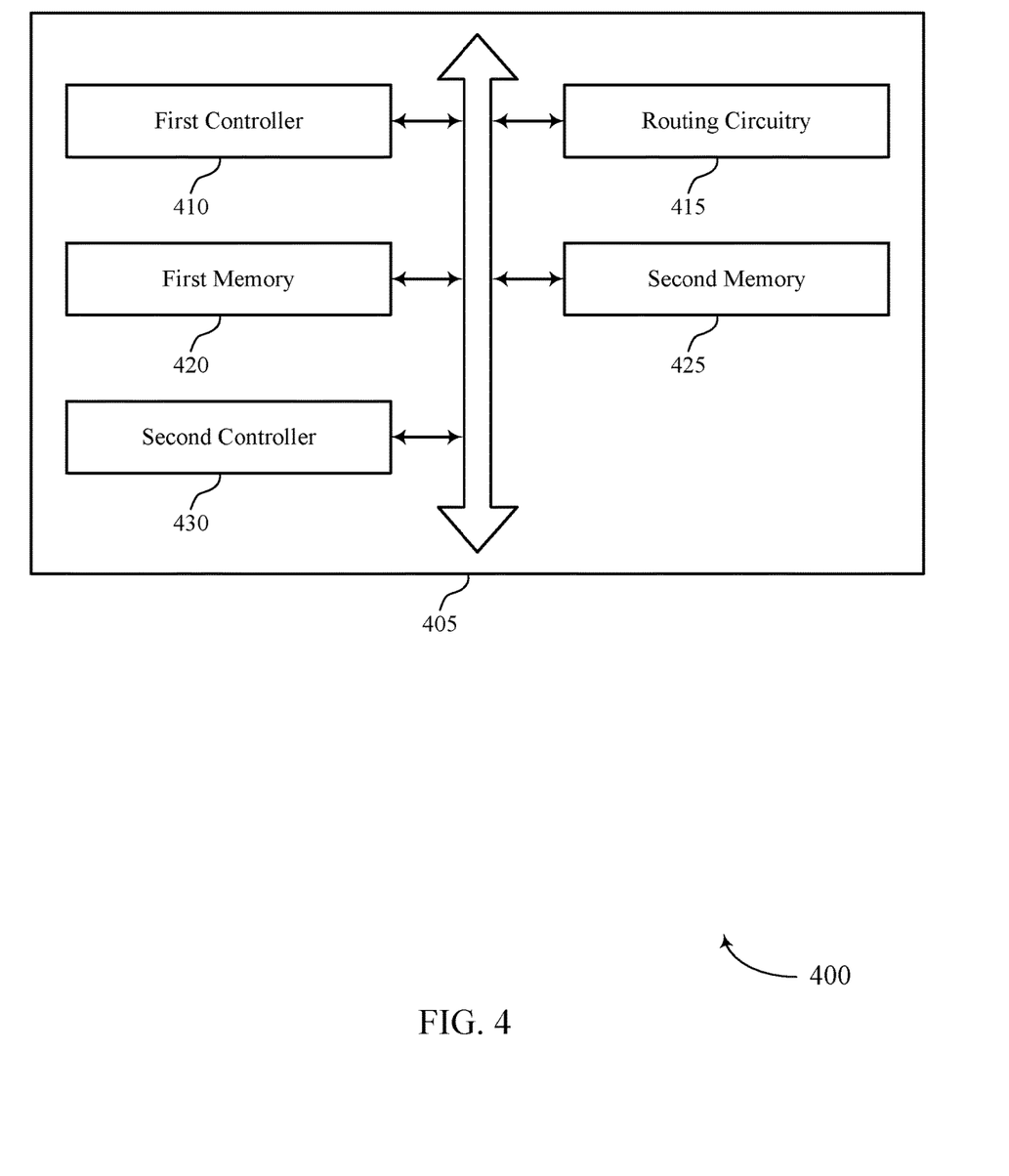
FIG. 4 shows a block diagram of a memory device that supports improved inter-memory movement in a multi-memory system in accordance with aspects of the present disclosure.

FIG. 4 shows a block diagram 400 of a memory device 405 that supports improved inter-memory movement in a multi-memory system in accordance with examples as disclosed herein. The memory device 405 may be an example of aspects of a memory subsystem as described with reference to FIGS. 1 and 2. The memory device 405 may include a first controller 410, routing circuitry 415, a first memory 420, a second memory 425, and a second controller 430. Each of these modules may communicate, directly or indirectly, with one another (e.g., via one or more buses). The first controller 410 may be for the first memory 420 and the second controller 430 may be for at least the second memory 425. In some cases, the first memory 420 has a greater access latency and lower power consumption than the second memory 425, and where the first memory 420 is operated as a longer term storage compared to the second memory 425 and the second memory 425 is operated as a main memory or a cache.

The first controller 410 may be or include logic, circuitry, a processor, a controller, or other components capable of performing the functions described herein. The routing circuitry 415 may be or include data buses, data bus interfaces, switches, multiplexers, I/O channels, logic, buffers, or other components capable of performing the functions described herein. The first memory 420 may be or include a memory, memory array, memory die, or other components capable of performing the functions described herein. The second memory 425 may be or include a memory, memory array, memory die, or other components capable of performing the functions described herein. The second controller 430 may be or include logic, circuitry, a processor, a controller, or other components capable of performing the functions described herein.

The first controller 410 may receive, from a host device, an address for the second memory 425 and a command to move data between the first memory 420 and the second memory 425. In some examples, the first controller 410 may transmit, based on the command, the second address and an access command to a second controller for the second memory 425. In some examples, the first controller 410 may receive, from a host device, an address for the second memory 425 and a command to move data between the first memory 420 and the second memory 425.

In some examples, the first controller 410 may transmit, based on the command, the second address and an access command to a second controller for the second memory 425. In some examples, the first controller 410 may transmit, after reception of the command and before transmission of the access command to the second controller, an indication to the host device that the host device is to suspend activity to the second memory 425.

In some examples, the first controller 410 may transmit, based on storing the data in the first memory 420, an indication to the host device that the host device may resume activity to the second memory 425. In some examples, the first controller 410 may determine that at least a portion of the data is ready to be communicated from the first memory 420. In some examples, the first controller 410 may transmit, based on determining that at least the portion of the data is ready to be communicated from the first memory 420, an indication to the host device that the host device is to suspend activity to the second memory 425.

In some examples, the first controller 410 may transmit, based on the data being stored in the second memory 425, an indication to the host device that the host device may resume activity to the second memory 425. In some examples, the first controller 410 may transmit, after reception of the command and before transmission of the access command to the second controller, an indication to the host device that the host device is to suspend activity to the second memory 425.

In some examples, the first controller 410 may transmit, based on storing the data in the first memory 420, an indication to the host device that the host device may resume activity to the second memory 425. In some examples, the first controller 410 may transmit a read command for the second memory 425 to the second controller. In some examples, the first controller 410 may determine that at least a portion of the data is ready to be communicated from the first memory 420.

In some examples, the first controller 410 may transmit, based on determining that at least the portion of the data is ready to be communicated from the first memory 420, an indication to the host device that the host device is to suspend activity to the second memory 425. In some examples, the first controller 410 may transmit, based on the data being stored in the second memory 425, an indication to the host device that the host device may resume activity to the second memory 425. In some examples, the first controller 410 may transmit a write command for the second memory to the second controller for the second memory 425.

The routing circuitry 415 may communicate, based at least in part transmission of the second address and the access command, the data between the first memory 420 and the second memory 425 via a data path external to the host device. In some examples, the routing circuitry 415 may communicate, based at least in part transmission of the second address and the access command, the data between the first memory 420 and the second memory 425 via a data path external to the host device.

The first memory 420 may store the data in the first memory 420. In some examples, the first memory 420 may perform a write operation on one or more memory cells at the first address to write the portion of the data to the first memory 420. In some examples, the first memory 420 may perform a read operation on one or more memory cells at the first address to read at least a portion of the data from the first memory 420. In some examples, the first memory 420 may store the data in the first memory 420. In some examples, the first memory 420 may perform a write operation on one or more memory cells at the first address to write the portion of the data to the first memory 420. In some examples, the first memory 420 may perform a read operation on one or more memory cells at the first address to read at least a portion of the data from the first memory 420.

In some cases, the first memory 420 has a greater access latency and lower power consumption than the second memory 425, and where the first memory 420 is operated as a longer term storage compared to the second memory 425 and the second memory 425 is operated as a main memory or a cache.

The second memory 425 may perform, based on the read command, a read operation on one or more memory cells at the second address to read at least a portion of the data from the second memory 425. In some examples, the second memory 425 may store the data in the second memory 425. In some examples, the second memory 425 may perform, based on the write command, a write operation on one or more memory cells at the second address to write the portion of the data to the second memory 425. In some examples, the second memory 425 may perform, based on the read command, a read operation on one or more memory cells at the second address to read at least a portion of the data from the second memory 425. In some examples, the second memory 425 may store the data in the second memory 425. In some examples, the second memory 425 may perform, based on the write command, a write operation on one or more memory cells at the second address to write the portion of the data to the second memory 425.

The second controller 430 may receive, from the host device, one or more access commands for the second memory 425 during a duration in which the data is prepared for communication by the first memory 420. In some examples, the second controller 430 may service the one or more access commands at the second memory 425 during the duration in which the data is prepared by the first memory 420.

Figure 5:
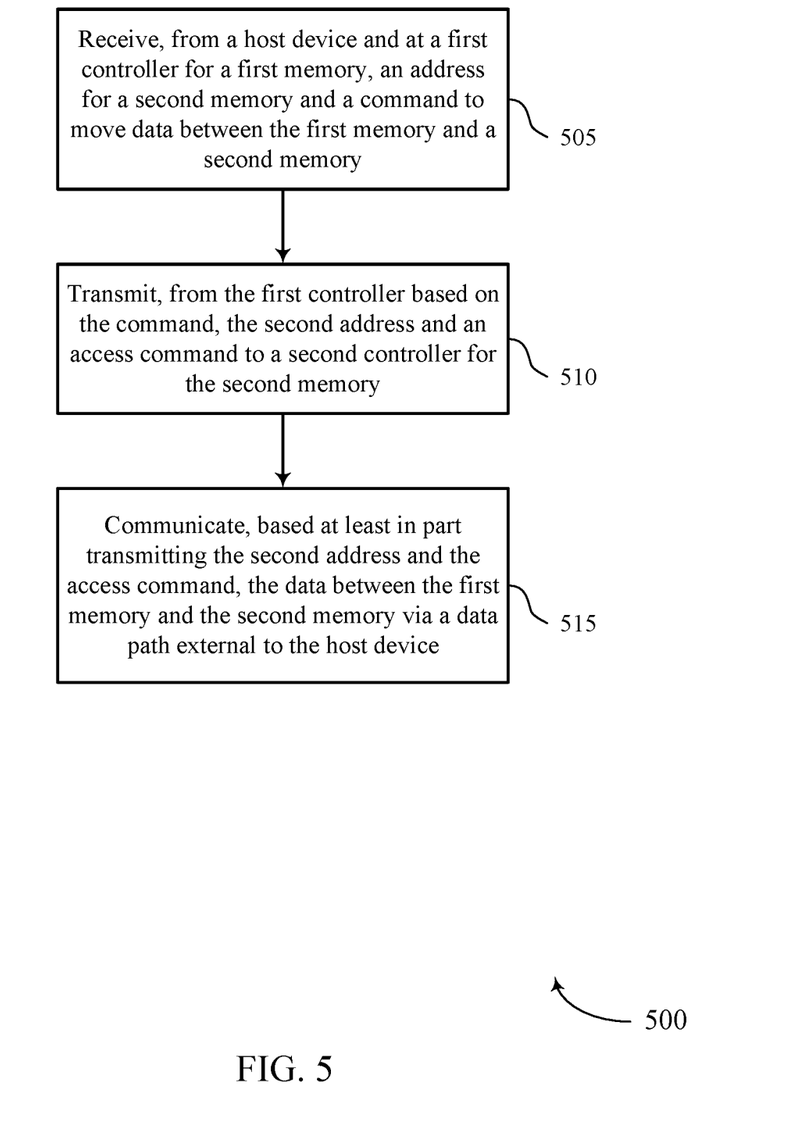
FIG. 5 shows a flowchart illustrating a method or methods that support improved inter-memory movement in a multi-memory system in accordance with examples as disclosed herein.

FIG. 5 shows a flowchart illustrating a method or methods 500 that supports improved inter-memory movement in a multi-memory system in accordance with aspects of the present disclosure. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, the method may include receiving, from a host device and at a first controller for a first memory, an address for a second memory and a command to move data between the first memory and a second memory. The operations of 505 may be performed according to the methods described herein. In some examples, aspects of the operations of 505 may be performed by a first controller as described with reference to FIG. 4.

At 510, the method may include transmitting, from the first controller based on the command, the second address and an access command to a second controller for the second memory. The operations of 510 may be performed according to the methods described herein. In some examples, aspects of the operations of 510 may be performed by a first controller as described with reference to FIG. 4.

At 515, the method may include communicating, based at least in part transmitting the second address and the access command, the data between the first memory and the second memory via a data path external to the host device. The operations of 515 may be performed according to the methods described herein. In some examples, aspects of the operations of 515 may be performed by a data path components as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for receiving, from a host device and at a first controller for a first memory, an address for a second memory and a command to move data between the first memory and a second memory, transmitting, from the first controller based on the command, the second address and an access command to a second controller for the second memory, and communicating, based at least in part transmitting the second address and the access command, the data between the first memory and the second memory via a data path external to the host device.

Some examples of the method 500 and the apparatus described herein may further include operations, features, means, or instructions for transmitting, by the first controller after reception of the command and before transmission of the access command to the second controller, an indication to the host device that the host device may be to suspend activity to the second memory.

Some examples of the method 500 and the apparatus described herein may further include operations, features, means, or instructions for storing the data in the first memory, and transmitting, by the first controller based on storing the data in the first memory, an indication to the host device that the host device may resume activity to the second memory.

In some examples of the method 500 and the apparatus described herein, the command may be to move the data from the second memory, which may have a deterministic access timing, to the first memory, which may have a non-deterministic access timing, and where transmitting the access command may include operations, features, means, or instructions for transmitting a read command for the second memory to the second controller.

In some examples of the method 500 and the apparatus described herein, receiving may include operations, features, means, or instructions for performing, based on the read command, a read operation on one or more memory cells at the second address to read at least a portion of the data from the second memory, and performing a write operation on one or more memory cells at the first address to write the portion of the data to the first memory.

Some examples of the method 500 and the apparatus described herein may further include operations, features, means, or instructions for determining that at least a portion of the data may be ready to be communicated from the first memory, and transmitting, by the first controller based on determining that at least the portion of the data may be ready to be communicated from the first memory, an indication to the host device that the host device may be to suspend activity to the second memory.

Some examples of the method 500 and the apparatus described herein may further include operations, features, means, or instructions for receiving, from the host device, one or more access commands for the second memory during a duration in which the data may be prepared for communication by the first memory, and servicing the one or more access commands at the second memory during the duration in which the data may be prepared by the first memory.

Some examples of the method 500 and the apparatus described herein may further include operations, features, means, or instructions for storing the data in the second memory, and transmitting, by the first controller based on the data being stored in the second memory, an indication to the host device that the host device may resume activity to the second memory.

In some examples of the method 500 and the apparatus described herein, the command may be to move the data from the first memory, which may have a non-deterministic access timing, to the second memory, which may have a deterministic access timing, and where transmitting the access command may include operations, features, means, or instructions for transmitting a write command for the second memory to the second controller for the second memory.

In some examples of the method 500 and the apparatus described herein, receiving may include operations, features, means, or instructions for performing a read operation on one or more memory cells at the first address to read at least a portion of the data from the first memory, and performing, based on the write command, a write operation on one or more memory cells at the second address to write the portion of the data to the second memory.

In some examples of the method 500 and the apparatus described herein, the first memory may have a greater access latency and lower power consumption than the second memory, and where the first memory may be operated as a longer term storage compared to the second memory and the second memory may be operated as a main memory or a cache.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a first memory;
a second memory; and
a controller coupled with the first memory and the second memory, the controller configured to cause the apparatus to:
receive, from a host device and at a first controller for the first memory, an address and a command to move data;
determine that the command is an inter-memory data movement command for data movement between the first memory and the second memory via a data path that is internal to the apparatus and external to the host device;
determine, based at least in part on determining that the command is an inter-memory data movement command, that a direction of the data movement is from the second memory to the first memory;
transmit, to the host device from the first controller for the first memory, an indication for the host device to suspend access activity to the second memory based at least in part on determining that the command is an inter-memory data movement command, wherein the indication is transmitted before transmission of a read command for the data based at least in part on the direction of data movement being to the first memory from the second memory;
transmit, from the first controller, the address and the read command to a second controller for the second memory; and
communicate, based at least in part on transmitting the address and the read command, the data to the first memory from the second memory via the data path external to the host device.

2. The apparatus of claim 1, wherein the command is to move the data from the second memory, which has a deterministic access timing, to the first memory, which has a non-deterministic access timing.

3. The apparatus of claim 2, wherein the controller is further configured to cause the apparatus to:
store the data in the first memory; and
transmit, by the first controller based at least in part on storing the data in the first memory, an indication to the host device that the host device may resume activity to the second memory.

4. The apparatus of claim 2, wherein the address is for the second memory and receiving comprises receiving a second address for the first memory, and wherein the controller is further configured to cause the apparatus to:
perform, based at least in part on the read command, a read operation on one or more memory cells at the address to read at least a portion of the data from the second memory; and
perform a write operation on one or more memory cells at the second address to write the portion of the data to the first memory.

5. The apparatus of claim 1, wherein the first memory has a greater access latency and lower power consumption than the second memory, and wherein the first memory is operated as a longer term storage compared to the second memory and the second memory is operated as a main memory or a cache.

6. A method at a device, comprising:
receiving, from a host device and at a first controller for a first memory, an address and a command to move data;
determining that the command is an inter-memory data movement command for data movement between the first memory and a second memory via a data path that is internal to the device and external to the host device;
determining, based at least in part on determining that the command is an inter-memory data movement command, that a direction of the data movement is from the second memory to the first memory;
transmitting, to the host device from the first controller for the first memory, an indication for the host device to suspend access activity to the second memory based at least in part on determining that the command is an inter-memory data movement command, wherein the indication is transmitted before transmission of a read command for the data based at least in part on the direction of data movement being to the first memory from the second memory;
transmitting, from the first controller, the address and the read command to a second controller for the second memory; and
communicating, based at least in part on transmitting the address and the read command, the data to the first memory from the second memory via the data path external to the host device.

7. The method of claim 6, wherein the command is to move the data from the second memory, which has a deterministic access timing, to the first memory, which has a non-deterministic access timing.

8. The method of claim 7, further comprising:
storing the data in the first memory; and
transmitting, by the first controller based at least in part on storing the data in the first memory, an indication to the host device that the host device may resume activity to the second memory.

9. The method of claim 6, wherein the address is for the second memory, the method further comprising:
performing, based at least in part on the read command, a read operation on one or more memory cells at the address to read at least a portion of the data from the second memory; and performing a write operation on one or more memory cells at a second address to write the portion of the data to the first memory.

10. The method of claim 6, wherein the address is for the second memory, the method further comprising:
performing a read operation on one or more memory cells at the address to read at least a portion of the data from the second memory;
transmit, from the first controller based at least in part on performing the read operation, a write command to the first memory; and
performing, based at least in part on the write command, a write operation on one or more memory cells at a second address to write the portion of the data to the first memory.

11. The method of claim 6, wherein the first memory has a greater access latency and lower power consumption than the second memory, and wherein the first memory is operated as a longer term storage compared to the second memory and the second memory is operated as a main memory or a cache.

12. A non-transitory computer-readable medium storing code comprising instructions which, when executed by a processor of an electronic device, cause the electronic device to:
receive, from a host device and at a first controller for a first memory, an address and a command to move data;
determine that the command is an inter-memory data movement command for data movement between the first memory and a second memory via a data path that is internal to the electronic device and external to the host device;
determine, based at least in part on determining that the command is an inter-memory data movement command, that a direction of the data movement is from the second memory to the first memory;
transmit, to the host device from the first controller for the first memory, an indication for the host device to suspend access activity to the second memory based at least in part on determining that the command is an inter-memory data movement command, wherein the indication is transmitted before transmission of a read command for the data based at least in part on the direction of data movement being to the first memory from the second memory;
transmit, from the first controller, the address and the read command to a second controller for the second memory; and
communicate, based at least in part on transmitting the address and the read command, the data to the first memory from the second memory via the data path external to the host device.

* * * * *